United States Patent
Wang et al.

(10) Patent No.: US 8,896,479 B2
(45) Date of Patent: Nov. 25, 2014

(54) GPS SIGNAL RECEPTION APPARATUS AND METHOD

(75) Inventors: Jin-Chun Wang, Daejeon (KR); Dong-Hoon Shin, Daejeon (KR); Ui-Jung Kim, Daejeon (KR); Dae-Heon Lee, Daejeon (KR); Hae-Yong Yang, Daejeon (KR); Seong-Taek Chee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 542 days.

(21) Appl. No.: 13/327,432

(22) Filed: Dec. 15, 2011

(65) Prior Publication Data

US 2013/0106640 A1    May 2, 2013

(30) Foreign Application Priority Data

Nov. 2, 2011  (KR) .................. 10-2011-0113207

(51) Int. Cl.
*G01S 7/36* (2006.01)
*G01S 13/00* (2006.01)
*G01S 19/21* (2010.01)
*G01S 7/02* (2006.01)

(52) U.S. Cl.
CPC .............. *G01S 19/21* (2013.01); *G01S 7/023* (2013.01); *G01S 7/36* (2013.01)
USPC .............. 342/16; 342/13; 342/17; 342/159; 342/357.59

(58) Field of Classification Search
CPC ....... G01S 5/0215; G01S 7/021; G01S 7/023; G01S 7/2813; G01S 7/36; G01S 7/38
USPC .......... 342/13–20, 159–164, 357.22, 357.59, 342/357.72
See application file for complete search history.

(56) References Cited

U.S. PATENT DOCUMENTS

| | | | | |
|---|---|---|---|---|
| 5,107,273 A * | 4/1992 | Roberts | .......................... | 342/417 |
| 5,461,387 A * | 10/1995 | Weaver | .................... | 342/357.27 |
| 5,579,016 A * | 11/1996 | Wolcott et al. | ................. | 342/378 |
| 5,678,171 A * | 10/1997 | Toyama et al. | ................... | 725/76 |
| 5,739,788 A * | 4/1998 | Dybdal et al. | ................ | 342/359 |
| 5,952,968 A * | 9/1999 | McDowell | ..................... | 342/383 |
| 5,990,831 A * | 11/1999 | McDowell | ..................... | 342/378 |
| 6,084,540 A * | 7/2000 | Yu | ..................................... | 342/17 |
| 6,115,409 A * | 9/2000 | Upadhyay et al. | ............. | 375/144 |
| 6,141,371 A * | 10/2000 | Holmes et al. | ................ | 375/130 |
| 6,167,286 A * | 12/2000 | Ward et al. | ................. | 455/562.1 |
| 6,828,935 B1 * | 12/2004 | Dunn et al. | .................... | 342/375 |
| 7,009,557 B2 * | 3/2006 | Kirchofer et al. | ............. | 342/359 |

(Continued)

FOREIGN PATENT DOCUMENTS

KR    10-0684272 B1    2/2007

*Primary Examiner* — Peter Bythrow
(74) *Attorney, Agent, or Firm* — LRK Patent Law Firm

(57) ABSTRACT

A Global Positioning System (GPS) signal reception apparatus including a GPS antenna unit, a GPS signal selection unit, and a jamming signal detection unit is provided. The GPS antenna unit includes a first-type antenna and a plurality of second-type antennas which have directivities different from each other. The GPS signal selection unit selects any one of the first-type antenna and the plurality of second-type antennas as a selected antenna. The jamming signal detection unit detects a jamming signal present in a GPS signal by analyzing the GPS signal which is received via the selected antenna.

17 Claims, 7 Drawing Sheets

(56) References Cited

U.S. PATENT DOCUMENTS

| | | | |
|---|---|---|---|
| 7,250,903 B1* | 7/2007 | McDowell | 342/357.59 |
| 7,417,597 B1* | 8/2008 | Lopez | 343/799 |
| 7,450,082 B1* | 11/2008 | Lopez | 343/850 |
| 7,577,464 B2* | 8/2009 | Ezal et al. | 455/562.1 |
| 7,579,984 B2* | 8/2009 | Wang et al. | 342/357.59 |
| 7,616,169 B2* | 11/2009 | Holter | 343/844 |
| 8,035,562 B2* | 10/2011 | Chang | 342/417 |
| 2003/0133524 A1* | 7/2003 | Miller et al. | 375/347 |
| 2004/0164900 A1* | 8/2004 | Casabona et al. | 342/420 |
| 2007/0211791 A1* | 9/2007 | Ganguly et al. | 375/148 |
| 2008/0291079 A1* | 11/2008 | Chang | 342/174 |
| 2008/0303714 A1* | 12/2008 | Ezal et al. | 342/357.12 |
| 2010/0007555 A1* | 1/2010 | Ezal et al. | 342/357.12 |

\* cited by examiner

//GPS SIGNAL RECEPTION APPARATUS AND METHOD

CROSS REFERENCE TO RELATED APPLICATION

This application claims the benefit of Korean Patent Application No. 10-2011-0113207, filed on Nov. 2, 2011, which is hereby incorporated by reference in its entirety into this application.

BACKGROUND OF THE INVENTION

1. Technical Field

The present invention relates generally to a Global Positioning System (GPS) signal reception apparatus and method and, more particularly, to a GPS signal reception apparatus and method which can efficiently avoid a GPS jamming signal using sector antennas, which have respective directivities, in a time synchronization GPS reception system which is vulnerable to electronic interference (jamming).

2. Description of the Related Art

GPS is a satellite navigation system which can obtain information about the location, speed, and time of a receiver by receiving GPS signals, transmitted from satellites, on the ground. GPS has been used in the fields of navigation, geodetic surveys, and precise time measurements in which time information is used in order to synchronize the time of a financial or communication network.

Jamming refers to the generation of the failure to receive an originally targeted radio signal because of another radio signal. Because the strength of a GPS signal is very weak, the corresponding signal is vulnerable to jamming, and low-power interference may easily jam the reception of a GPS signal.

Conventional technologies for handling GPS jamming may be divided into a previous correlation technology and a post correlation technology depending on the implementation location.

First, the previous correlation technology corresponds to a technology which is implemented at a location before a GPS receiver. Although the previous correlation technology has an advantage in that existing GPS receivers can be used without having to be changed, the previous correlation technology has disadvantages in that it is expensive to implement a relevant apparatus and the apparatus is large in size because of its technology being complicated.

Meanwhile, the post correlation technology corresponds to a technology which is processed at the step of tracing GPS carriers and codes using data digitized using common GPS antennas. The post correlation technology requires a relatively small amount of computational load compared to the previous correlation technology, so that the post correlation technology may be implemented in a GPS receiver. However, the post correlation technology has disadvantages in that existing GPS receivers should be modified and in that it is difficult to handle a strong jamming signal because anti-jamming gain is low, that is, 3 to 20 dB.

SUMMARY OF THE INVENTION

Accordingly, the present invention has been made keeping in mind the above problems occurring in the prior art, and an object of the present invention is to provide a GPS signal reception apparatus and method which can effectively avoid a GPS jamming signal using sector antennas, which have respective directivities, in a time synchronization GPS reception system which is vulnerable to electronic interference (jamming).

Another object of the present invention is to provide a GPS signal reception apparatus and method which can always receive one or more satellite signals, which are necessary for time synchronization, using sector antennas which function as general GPS antennas and, at the same time, determine whether a jamming signal exists when jamming is not occurring, and have directivities in which reception areas are spatially restricted when jamming is occurring.

Still another object of the present invention is to provide a GPS signal reception apparatus and method which can share the strength and type of a jamming signal via a network, thereby estimating the location of the source of a jamming signal.

In order to accomplish the above objects, the present invention provides a Global Positioning System (GPS) signal reception apparatus, including a GPS antenna unit configured to include a first-type antenna and a plurality of second-type antennas which have directivities different from each other; a GPS signal selection unit configured to select and connect any one of the first-type antenna and the plurality of second-type antennas; and a jamming signal detection unit configured to detect a jamming signal present in a GPS signal by analyzing the GPS signal which is received via the any one antenna selected from among the first-type antenna and the plurality of second-type antennas.

Here, when a jamming signal is detected from the GPS signal, the GPS signal selection unit sequentially connects the plurality of second-type antennas in response to a control signal from the jamming signal detection unit, and the jamming signal detection unit measures the strength of the jamming signal present in the GPS signal received via the second-type antenna which is connected to the GPS signal selection unit in sequence, and then performs control such that a second-type antenna in which the strength of the jamming signal is the weakest is finally connected.

The jamming signal detection unit may detect the jamming signal present in the GPS signal by calculating the noise level of a spectrum, obtained through Fast Fourier Transform (FFT) performed on the GPS signal, and then comparing the peak value of the spectrum with the noise level.

The jamming signal detection unit may determine that the corresponding GPS signal is the jamming signal if the peak value of a spectrum is greater than a noise level.

The jamming signal detection unit may determine the type of the jamming signal present in the GPS signal which is received from each of the plurality of second-type antennas.

Further, the present invention may further include a jamming signal alert unit for transmitting information about the type and strength of the jamming signal, which was detected by the jamming signal detection unit, to surrounding GPS signal reception apparatuses.

Further, the present invention may further include a GPS signal division unit for dividing the GPS signal, received via the antenna selected by the GPS signal selection unit, into two equal signals, and then outputting any one of the two signals, obtained through the division, to the jamming signal detection unit.

Further, the present invention may further include a time synchronization GPS reception unit for providing another signal of the two signals, obtained through the division performed by the GPS signal division unit, as a signal used for performing time synchronization.

The first-type antenna may be an exposed antenna in which a reception area is not restricted, and the plurality of second-type antennas may be sector antennas in which reception areas are spatially restricted.

Each of the plurality of second-type antennas may be arranged at a predetermined angle with respect to a horizontal plane, and may be provided with a metal plate therebetween.

Meanwhile, in order to accomplish the above objects, the present invention provides a GPS signal reception method, including selecting and connecting any one of a first-type antenna and a plurality of second-type antennas which have directivities different from each other; detecting a jamming signal present in a GPS signal by analyzing the GPS signal which is received from any one antenna selected from among the first-type antenna and the plurality of second-type antennas; when a jamming signal is detected in the GPS signal, measuring the strength of the jamming signal present in the GPS signal which was received from each of the second-type antennas while sequentially connecting the plurality of second-type antennas; and finally connecting a second-type antenna in which the strength of the jamming signal is the weakest from among the plurality of second-type antennas.

The detecting the jamming signal may include performing FFT on the GPS signal; calculating the noise level of a spectrum obtained by the FFT; and comparing the peak value of the spectrum with the noise level.

The detecting the jamming signal may include determining that the corresponding GPS signal is the jamming signal if the peak value of the spectrum is greater than the noise level.

The detecting the jamming signal may include determining the type of the jamming signal present in the GPS signal which is received from each of the plurality of second-type antennas.

The GPS signal reception method may further include transmitting information about the type and strength of the jamming signal to surrounding GPS signal reception apparatuses.

The GPS signal reception method may further include dividing the GPS signal, received via the selected antenna, into two signals, and the detecting the jamming signal includes detecting the jamming signal by analyzing any one of the two signals obtained through division.

The GPS signal reception method may further include providing another signal of the two signals, obtained by the division, as a signal used for performing time synchronization.

The first-type antenna is an exposed antenna in which a reception area is not restricted, and the plurality of second-type antennas may be sector antennas in which reception areas are spatially restricted.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
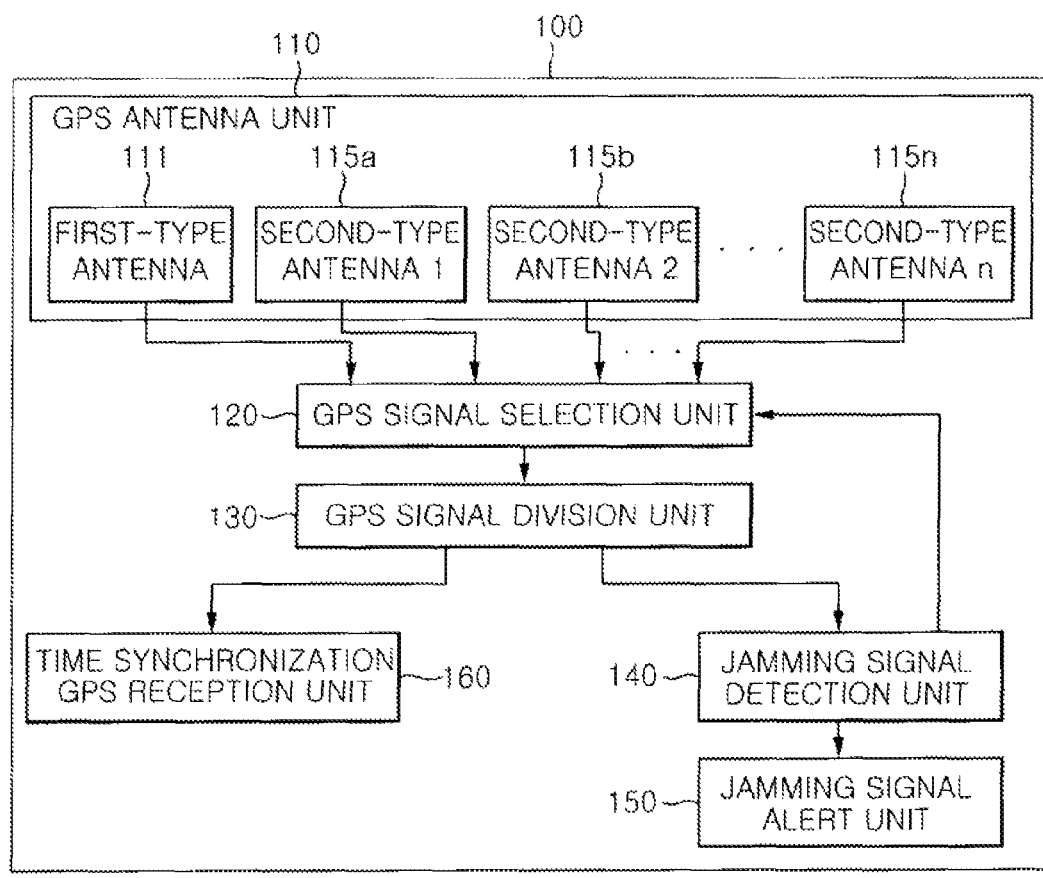
FIG. 1 is a block diagram illustrating the configuration of a GPS signal reception apparatus according to the present invention.

Reference now should be made to the drawings, throughout which the same reference numerals are used for designating the same or similar components.

Embodiments of the present invention will be described below with reference to the accompanying drawings.

FIG. 1 is a block diagram illustrating the configuration of a GPS signal reception apparatus according to the present invention.

As shown in FIG. 1, the GPS signal reception apparatus according to the present invention includes a GPS antenna unit 110, a GPS signal selection unit 120, a GPS signal division unit 130, a jamming signal detection unit 140, a jamming signal alert unit 150, and a time synchronization GPS reception unit 160.

The GPS antenna unit 110 includes a first-type antenna 111, and second-type antennas 115a to 115n which are different from the first-type antenna 111. For example, the first-type antenna 111 is used as an exposed antenna in which a reception area is not restricted is applied to, and each of the second-type antennas 115a to 115n is used as a sector antenna in which a reception area is spatially restricted is applied to. Here, a plurality of second-type antennas is provided.

In this case, when there is no jamming signal present in a GPS signal, an exposed antenna is used for capturing the maximum number of GPS signals. When a jamming signal is present in a GPS signal, sector antennas are used for capturing at least one GPS signal while restricting a reception area so that the jamming signal may be spatially avoided.

Further, the directivities of the respective plurality of second-type antennas 115a to 115n are different from each other and are different from that of the first-type antenna. An embodiment, in which the first-type antenna 111 and the plurality of second-type antennas 115a to 115n are arranged, will be described with reference to FIG. 4.

Meanwhile, the GPS signal selection unit 120 selects and connects one of the first-type antenna 111 and the plurality of second-type antennas 115a to 115n in response to a received control signal, and then transmits a GPS signal, received from the connected antenna, to the GPS signal division unit 130. Here, the GPS signal selection unit 120 may select and connect any one of the first-type antenna III and the plurality of second-type antennas 115a to 115n in response to a control signal received from the jamming signal detection unit 140.

In this case, the antenna selected among the first-type antenna 111 and the plurality of second-type antennas 115a to 115n may correspond to the selected antenna in the claims.

For example, when a first control signal is received from the jamming signal detection unit 140, the GPS signal selection unit 120 selects and connects the first-type antenna 111. When a second control signal is received from the jamming signal detection unit 140, the GPS signal selection unit 120 connects the plurality of second-type antennas 115a to 115n. In the latter case, the GPS signal selection unit 120 sequentially connects the plurality of second-type antennas 115a to 115n in the sequence of arrangement of the plurality of second-type antennas 115a to 115n. That is, the GPS signal selection unit 120 changes the selected antenna sequentially among the plurality of second-type antennas 115a to 115n.

The GPS signal division unit 130 divides the GPS signal, received from the antenna connected by the GPS signal selection unit 120, into two equal GPS signals.

In this case, any one of the two GPS signals, obtained through the division performed by the GPS signal division unit 130, is output to the jamming signal detection unit 140 and then used for detecting a jamming signal present in the GPS signal. Meanwhile, the other one of the two GPS signals, obtained through the division performed by the GPS signal division unit 130, is output to the time synchronization GPS reception unit 160 and then used for performing time synchronization.

Therefore, the time synchronization GPS reception unit 160 provides the GPS signal, received from the GPS signal division unit 130, as a signal used for performing time synchronization.

The jamming signal detection unit 140 detects a jamming signal present in the GPS signal by analyzing the GPS signal received from the GPS signal division unit 130. Here, when a jamming signal is not detected in the received GPS signal, the jamming signal detection unit 140 generates the first control signal used for connecting the first-type antenna 111, and then outputs the first control signal to the GPS signal selection unit 120. Therefore, the GPS signal selection unit 120 connects the first-type antenna 111 in response to the first control signal received from the jamming signal detection unit 140.

Meanwhile, when a jamming signal is detected in the received GPS signal, the jamming signal detection unit 140 generates the second control signal used for connecting the plurality of second-type antennas 115a to 115n, and outputs the second control signal to the GPS signal selection unit 120. Therefore, the GPS signal selection unit 120 sequentially connects the plurality of second-type antennas 115a to 115n in response to the second control signal received from the jamming signal detection unit 140.

After the jamming signal detection unit 140 outputs the second control signal to the GPS signal selection unit 120, the jamming signal detection unit 140 analyzes a GPS signal received from each of the plurality of second-type antennas which are connected by the GPS signal selection unit 120, determines the type of a jamming signal present in the GPS signal, and measures the strength of the jamming signal.

The above-described operation is performed whenever the second-type antenna at a corresponding sequential position is connected. When all the second-type antennas 115a to 115n have been connected, the jamming signal detection unit 140 outputs a control signal, used for finally connecting the second-type antenna in which the strength of the jamming signal present in the GPS signal received from each of the second-type antennas 115a to 115n is the weakest, to the GPS signal selection unit 120.

Therefore, the GPS signal selection unit 120 is finally connected to the second-type antenna in which the strength of the jamming signal is the weakest, and receives the GPS signal via the connected second-type antenna.

Further, when a jamming signal is detected in the received GPS signal, the jamming signal detection unit 140 outputs information about the type and strength of the jamming signal to the jamming signal alert unit 150. In this case, the jamming signal alert unit 150 generates an alert signal by collecting the received information about the type and strength of the jamming signal, and then provides the generated alert signal to other surrounding GPS signal reception apparatuses over a network.

Figure 2:
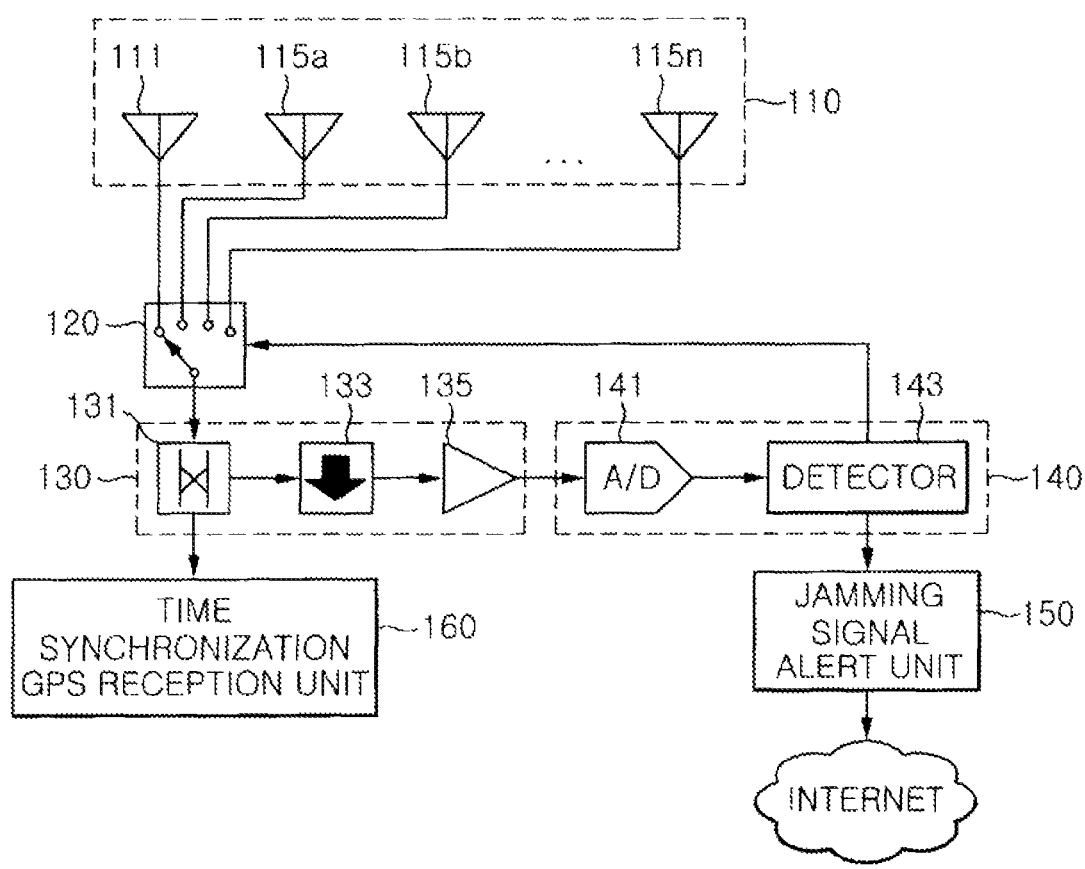
FIG. 2 is a view illustrating the detailed configuration of the GPS signal reception apparatus according to the present invention.

FIG. 2 is a view illustrating the detailed configuration of the GPS signal reception apparatus of FIG. 1. Therefore, the duplicated description of each of the components of FIG. 1 will be omitted in the description of FIG. 2.

As shown in FIG. 2, the GPS signal division unit 130 includes a coupler 131, a down converter 133, and an amplifier 135.

That is, when the GPS signal division unit 130 is connected to any one of the antennas, which was selected by the GPS signal selection unit 120, a GPS signal received via the connected antenna is input to the coupler 131, and the GPS signal is divided into two signals by the coupler 131. Here, one of the two signals is down converted into an intermediate frequency by the down converter 133, amplified into the level of the original signal by the amplifier 135, and then input to the jamming signal detection unit. Meanwhile, the other one of the two signals, obtained through the division performed by the coupler 131, is input to the time synchronization GPS reception unit 160 and then provided as a signal used for performing time synchronization.

Further, the jamming signal detection unit 140 includes an Analog-to-Digital (A/D) converter 141 and a detector 143.

That is, the GPS signal received from the GPS signal division unit 130 is input to the A/D converter 141, converted into a digital signal, and then input to the detector 143. The detector 143 detects a jamming signal by analyzing the received digital signal. The internal configuration of the detector 143 will be described with reference to FIG. 3.

Figure 3:
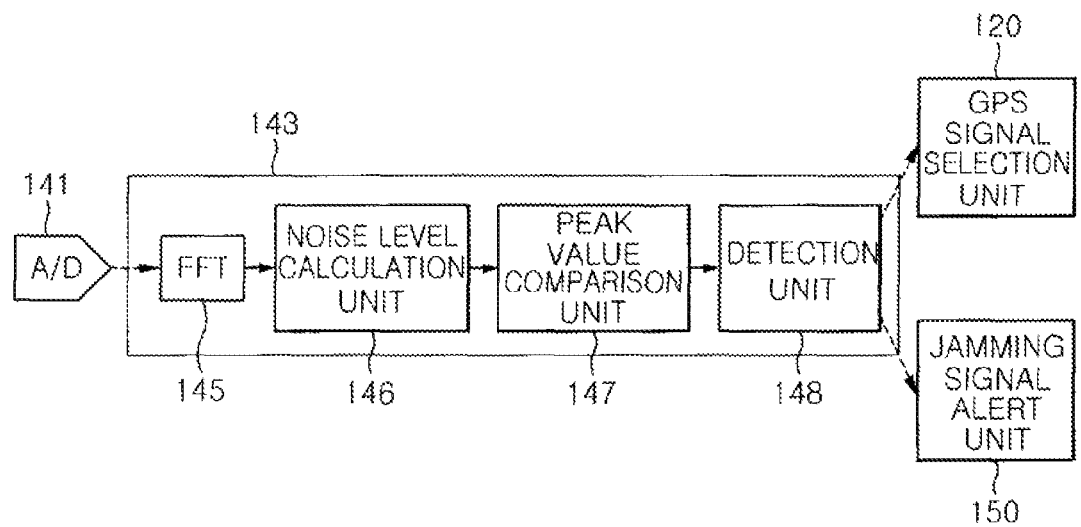
FIG. 3 is a block diagram illustrating the detailed configuration of a jamming signal detection unit according to the present invention.

FIG. 3 is a block diagram illustrating the detailed configuration of the jamming signal detection unit according to the present invention.

As shown in FIG. 3, the detector 143, that is, the detector 143 of the jamming signal detection unit includes a Fast Fourier Transformer (FFT) 145, a noise level calculation unit 146, a peak value comparison unit 147, and a detection unit 148.

When the digital signal of the GPS signal, obtained through the conversion performed by the A/D converter 141, is received, the FFT 145 transforms the received digital signal into a spectrum using a fast Fourier transform process. The results of the fast Fourier transform performed by the FFT 145 are input to the noise level calculation unit 146.

The noise level calculation unit 146 calculates the noise level of the spectrum obtained by performing fast Fourier transform on the received signal.

The noise level calculation unit 146 calculates the noise level of the spectrum with reference to Equation 1.

$$N_0 = \frac{1}{N-M}\left(\sum_{i=1}^{N} F_i - \sum_{i=1}^{M} downsort(F_i)\right) \quad (1)$$

where $N_0$ is a noise level, N is the number of FFT bins, M is the number of bins which have a level of −110 dB or greater, $F_i$ is the size of the i-th bin of the FFT, and downsort( ) is a descending sequence sort.

Thereafter, the peak value comparison unit 147 compares the noise level calculated by the noise level calculation unit 146 with the peak value of the spectrum. If, as a result of the comparison of the peak value of the spectrum and the noise level, a signal whose peak value of the spectrum is greater than the noise level is detected, the detection unit 148 determines that the corresponding signal, that is, the signal whose peak value of the spectrum which is greater than the noise level, is a jamming signal.

Therefore, the detector 143 detects a jamming signal present in the GPS signal, generates the first control signal or the second control signal depending on whether a jamming signal is detected in the GPS signal, and then outputs the first control signal or the second control signal to the GPS signal selection unit 120.

For example, if it is determined that a jamming signal is present in the GPS signal, the GPS signal selection unit 120 selects and connects a second-type antenna 1 at a first sequential position, and the jamming signal detection unit calculates the peak value of the spectrum of the jamming signal received from the second-type antenna 1. Thereafter, the GPS signal selection unit 120 selects and connects a second-type antenna 2 at a subsequent sequential position, and the jamming signal detection unit calculates the peak value of the spectrum of the jamming signal received from the second-type antenna 2.

In the above-described manner, the peak value of the spectrum of a jamming signal which is received from each of the second-type antennas is sequentially calculated, a second-type antenna in which the peak value of the spectrum of a jamming signal is the lowest is extracted from the second-type antennas, and then the extracted second-type antenna is finally connected to the GPS signal selection unit 120.

If a jamming signal present in the GPS signal is detected, the detection unit 148 determines the type and strength of the jamming signal present in the GPS signal which is received from each of the second-type antennas, and then outputs relevant information to the jamming signal alert unit 150.

Here, the peak value of the spectrum of a jamming signal obtained using the FFT 145 corresponds to the strength of the jamming signal, and the type of the jamming signal can be determined by determining whether the frequency of the jamming signal has been changed and by measuring the bandwidth of the jamming signal.

Figure 4:
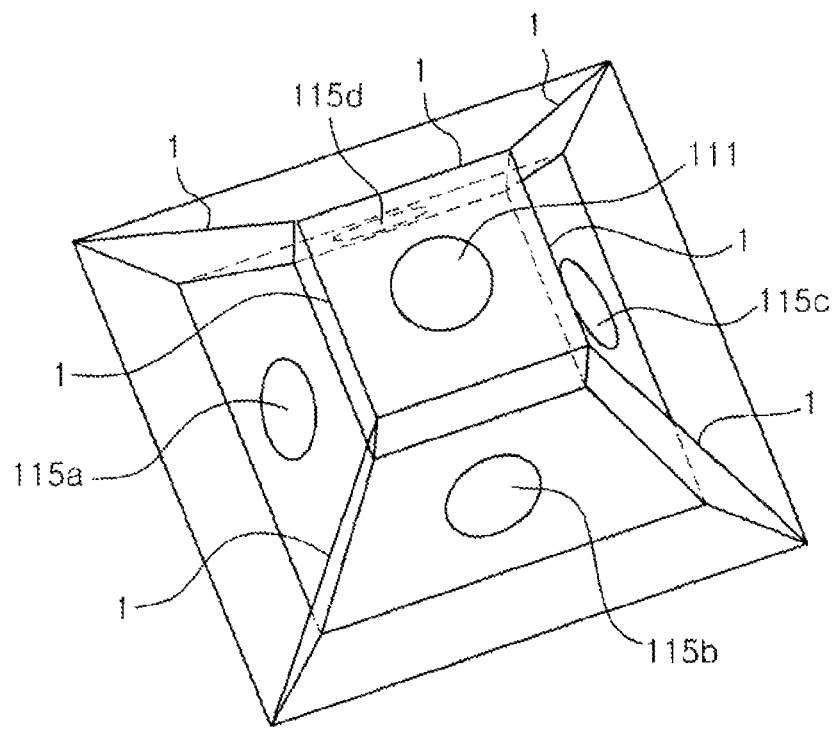
FIG. 4 is a view illustrating the arrangement of the antennas of a GPS antenna unit according to the present invention.

FIG. 4 is a view illustrating an example of the arrangement of the antennas of the GPS antenna unit according to the present invention.

The GPS antenna unit according to the present invention includes a first-type antenna 111 and a plurality of second-type antennas 115a to 115d. Here, the first-type antenna 111 is used as an exposed antenna in which a reception area is not restricted is applied to, and each of the plurality of second-type antennas 115a to 115d is used as a sector antenna in which a reception area is spatially restricted is applied to.

In FIG. 4, the first-type antenna 111 is arranged toward the ceiling such that a reception area is not restricted. Meanwhile, the second-type antennas 115a to 115d are arranged to surround the first-type antenna 111 and to have gradient to a horizontal plane in order to have respective directivities. Further, a metal plate 1 is provided between each of the second-type antennas 115a to 115d in order to restrict the reception area of each of the second-type antennas 115a to 115d.

In the present invention, it is preferable that four second-type antennas 115a to 115d be provided as shown in FIG. 4. The reason for this is that each of the antennas most reliably receives one or more GPS signals when the reception angle of the antenna is 120° or greater, as the results of simulation.

Actually, since a reception area restricted by the metal plates 1 cannot completely restrict a reception angle because of the radio wave characteristics and the antenna reception characteristics, each of the four second-type antennas 115a to 115d does not have a reception angle of 90° formed by the metal plates 1, but has a reception angle of approximately 120°.

It is apparent that the above-described reception angle is only a preferred embodiment, and is not limited thereto.

Figure 5:
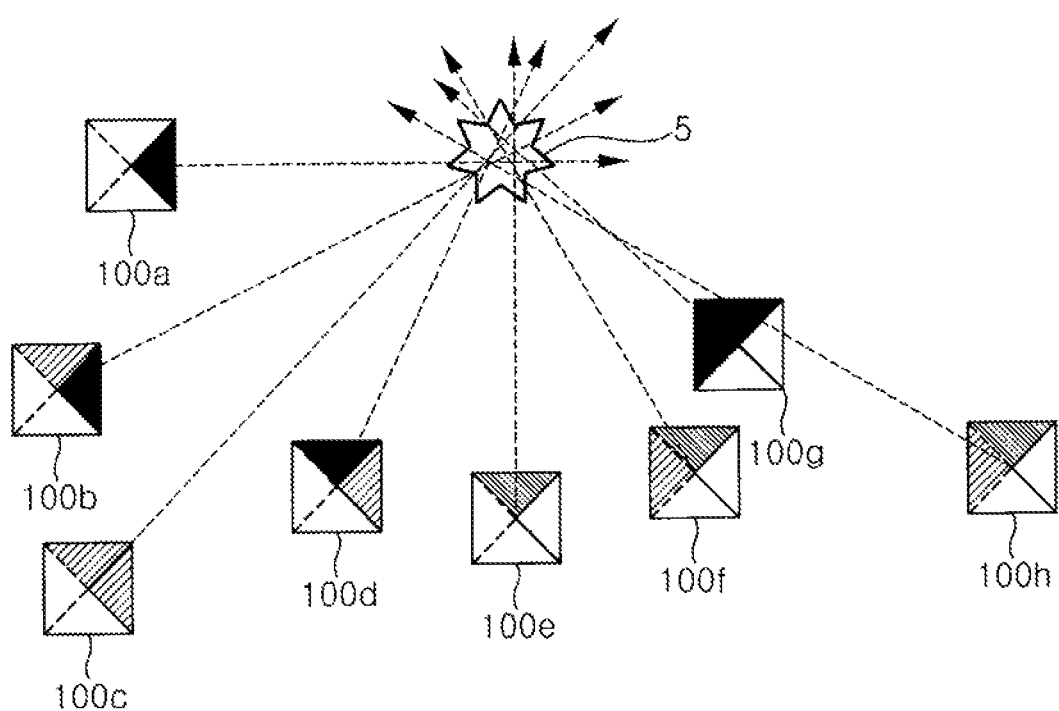
FIG. 5 is a view illustrating an example of a jamming signal alert operation performed by the GPS signal reception apparatus according to the present invention.

FIG. 5 is a view illustrating an example of a jamming signal alert operation performed by the GPS signal reception apparatus according to the present invention.

When it is determined that a jamming signal is present in a GPS signal, a GPS signal reception apparatus 100a according to the present invention determines information about the type and strength of the jamming signal and then transmits the information via a network, thereby notifying surrounding GPS signal reception apparatuses 110b to 100h of the generation of the jamming signal.

In this case, the surrounding GPS signal reception apparatuses 110b to 100h may be used for estimating the location of the source of the jamming signal based on the information about the type and strength of the jamming signal which was received from the GPS signal reception apparatus 100a according to the present invention.

As shown in FIG. 5, each of the surrounding GPS signal reception apparatuses 100b to 100h compares the degrees of strength of the respective jamming signals of a plurality of second-type antennas, estimates the direction of the source of a jamming signal based on the direction of an antenna in which the strength of the jamming signal is strong, and then draws an extension line in the direction of the source of the jamming signal, thereby estimating a spot, where extension lines obtained by the surrounding GPS signal reception apparatuses intersect each other, as the location of the source of the jamming signal.

A signal reception method using the GPS signal reception apparatus configured as described above according to the present invention will be described below.

Figure 6:
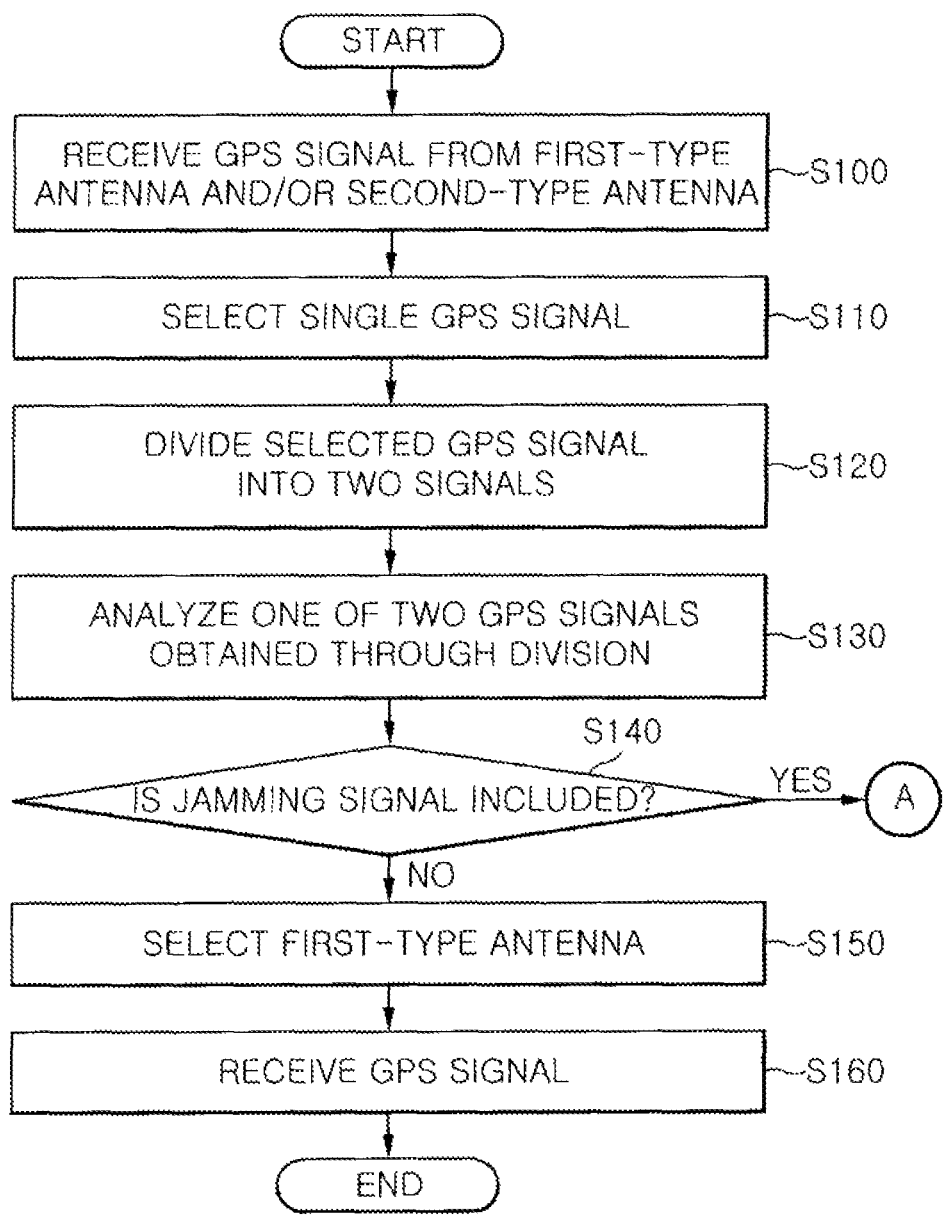
FIGS. 6 and 7 are flowcharts illustrating the flow of operations of a GPS signal reception method according to the present invention.
Figure 7:
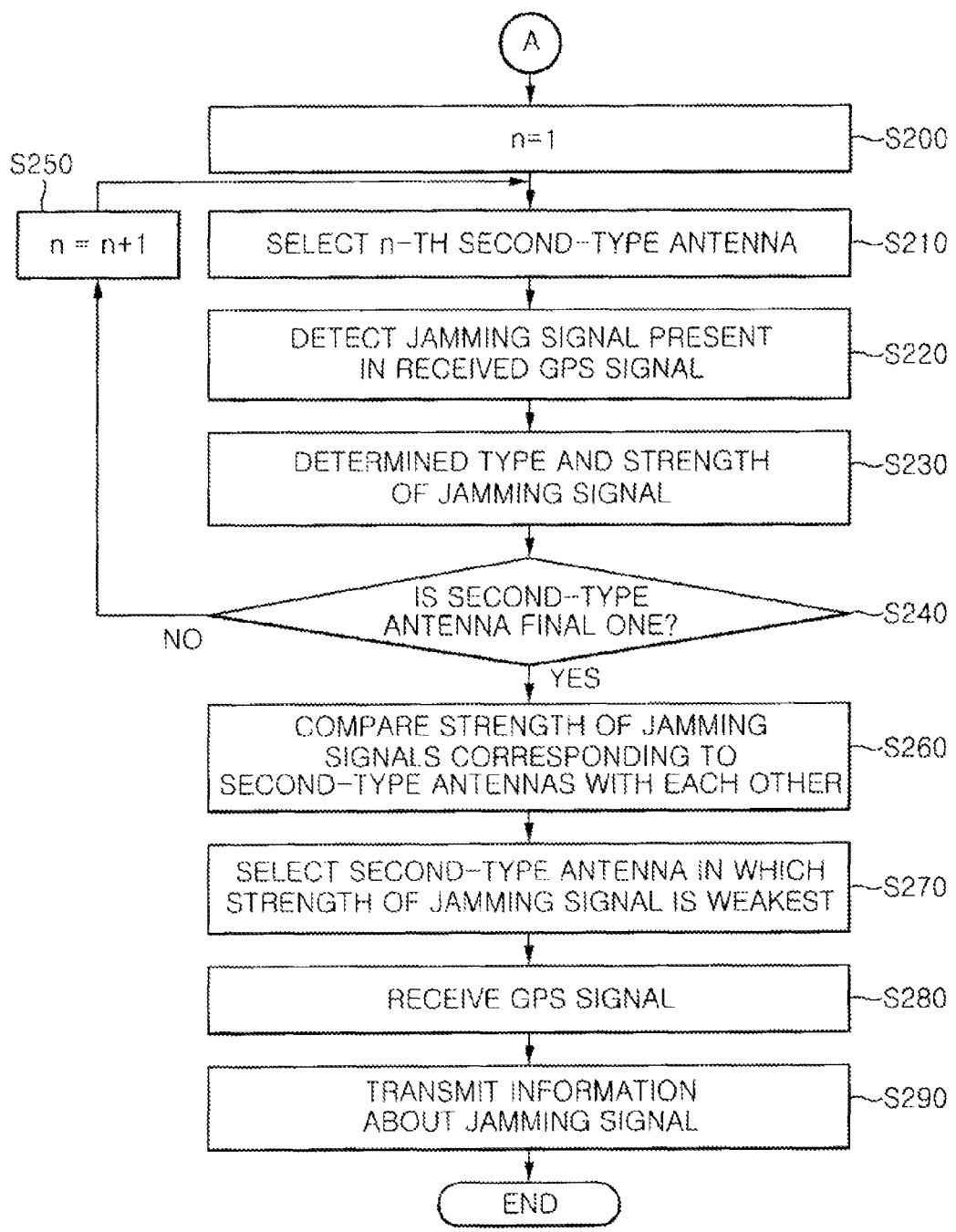

FIGS. 6 and 7 are flowcharts illustrating the operation of the GPS signal reception method according to the present invention.

Referring to FIG. 6, first, the GPS signal reception apparatus according to the present invention receives GPS signals from the first-type antenna and the plurality of second-type antennas at step S100. Here, the first-type antenna is used as an exposed antenna in which a reception area is not restricted, and the second-type antennas are used as sector antennas in which reception areas are spatially restricted and have directivities different from each other.

Thereafter, the GPS signal reception apparatus selects any one of the GPS signals received from the first-type antenna and the plurality of second-type antennas at step S110, divides the selected signal, which was received at step S110, into two signals at step S120, and then analyzes one of the two GPS signals at step S130. At step S130, it is determined whether the GPS signal includes a jamming signal. The flow of the detailed operations of step S130 will be described with reference to FIG. 8.

Figure 8:
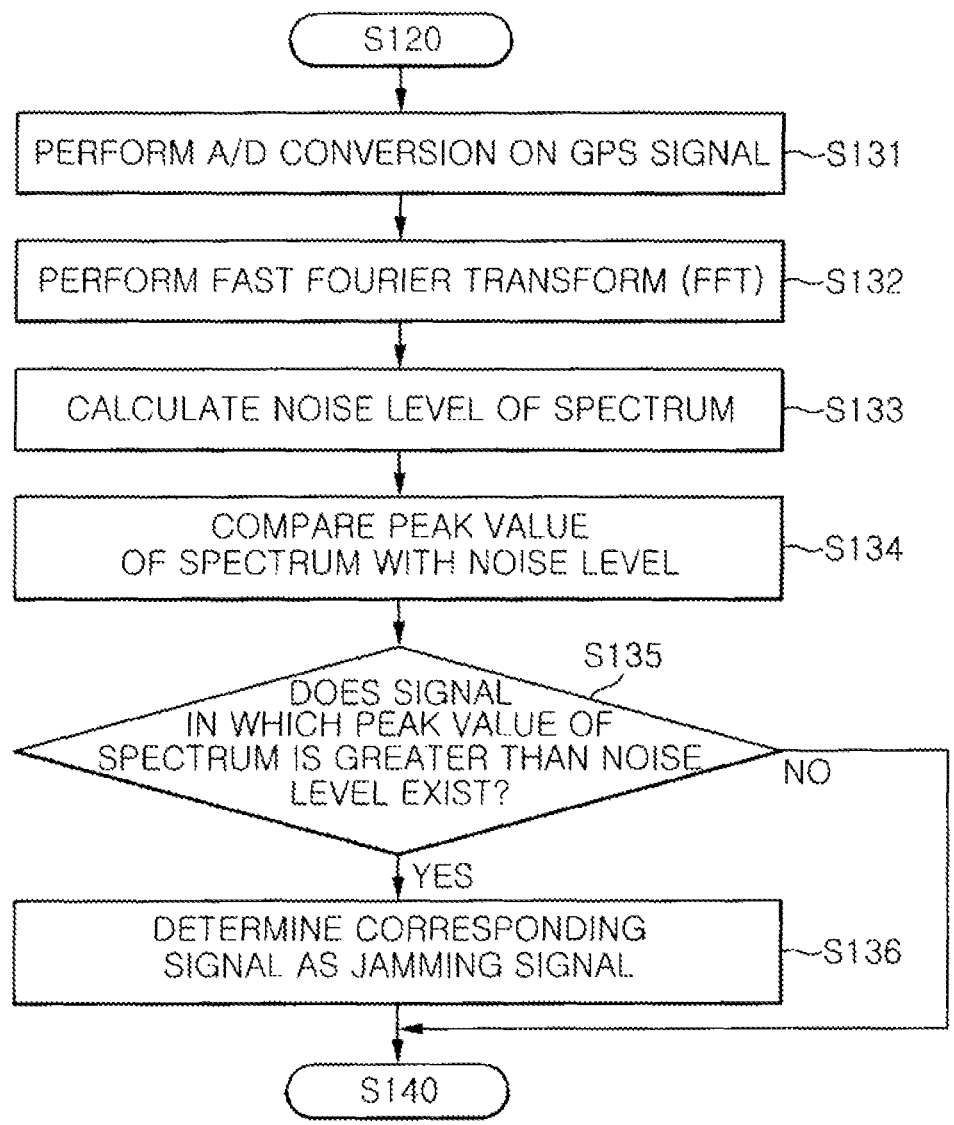
FIG. 8 is a flowchart illustrating the flow of detailed operations of the GPS signal analysis process of FIG. 6.

As shown in FIG. 8, one of the two GPS signals obtained at step S120 of FIG. 6 is converted into a digital signal using the A/D converter at step S131, and the digital signal is transformed into a spectrum using the fast Fourier transform process at step S132.

Thereafter, the GPS signal reception apparatus calculates the noise level of the spectrum obtained through the fast Fourier transform process at step S133, and then compares the peak value of the spectrum with the noise level at step S134.

If, as a result of the comparison at step S134, there is a signal whose peak value of the spectrum is greater than the noise level at step S135, the GPS signal reception apparatus determines that the corresponding signal is a jamming signal at step S136. Otherwise, the GPS signal reception apparatus determines that the GPS signal does not include a jamming signal, and the process proceeds to step S140.

If, as a result of the analysis of the GPS signal at step S130, it is determined that the corresponding GPS signal does not include a jamming signal at step S140, the first-type antenna is selected and connected at step S150, and then the GPS signal is received via the first-type antenna at step S160.

Meanwhile, if as the result of the analysis of the GPS signal at step S130, the corresponding GPS signal includes a jamming signal at step S140, the process proceeds to a step performed after "A" of FIG. 7.

FIG. 7 illustrates a case where the GPS signal includes a jamming signal, and illustrates the process of finally selecting any one of the plurality of second-type antennas based on the strength of the jamming signal and receiving the GPS signal.

In FIG. 7, the initial value of "n" is set to 1 at step S200.

Thereafter, the GPS signal reception apparatus selects and connects an n-th second-type antenna, that is, a first second-type antenna at step S210, detects a jamming signal present in a GPS signal received via the first second-type antenna at step S220, and then checks the type and strength of the detected jamming signal at step S230.

When a subsequent second-type antenna exists, the GPS signal reception apparatus adds 1 to "n" at step S250, selects and connects a second second-type antenna at step S210, and then determines the type and strength of the jamming signal of a GPS signal received via the second second-type antenna at steps S220 and S230.

The process performs steps from step S210 to S250 in such a way that 1 is sequentially added to "n" until the type and strength of a jamming signal received via a final second-type antenna are determined.

When the type and strength of the jamming signal corresponding to the final second-type antenna are determined, the levels of the strength of the jamming signal corresponding to the respective second-type antennas are compared with each other at step S260.

Here, a second-type antenna corresponding to the weakest jamming signal is finally selected and connected at step S270, and a GPS signal is received via the second-type antenna, which was finally connected to at step S270, at step S280.

It is apparent that information about the jamming signal may be provide in such a way as to transmit information about the type and strength of the jamming signal via an external network at step S290.

Although step S290 is performed after step S280 was performed in FIG. 7, the sequence of execution of the corresponding steps may vary depending on embodiments, for example, step S290 may be performed after step S230 was performed.

The present invention has an advantage of effectively avoiding a GPS jamming signal using sector antennas, which have directivities, in a time synchronization GPS reception system which is vulnerable to electronic interference (jamming).

Further, the present invention has the advantage of detecting whether a jamming signal exists while functioning as general GPS antennas when jamming is not occurring and always receiving one or more satellite signals, which are necessary for time synchronization, using sector antennas having directivities in which reception areas are spatially restricted when jamming is occurring.

Further, the present invention has an advantage of sharing the strength and type of a jamming signal via a network, thereby estimating the location of the source of a jamming signal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A Global Positioning System (GPS) signal reception apparatus, comprising:
a GPS antenna unit having a first-type antenna and a plurality of second-type antennas, the plurality of second-type antennas having directivities different from each other;
a GPS signal selection unit configured to select any one of the first-type antenna and the plurality of second-type antennas as a selected antenna; and
a jamming signal detection unit configured to detect a jamming signal present in a GPS signal by analyzing the GPS signal which is received via the selected antenna wherein, when a jamming signal is detected from the GPS signal, the GAS signal selection unit sequentially changes the selected antenna among the plurality of second-type antennas in response to a control signal from the jamming signal detection unit; and
wherein the jamming signal detection unit measures a strength of the jamming signal present in the GPS signal received via the selected antenna among the plurality of second-type antennas, and then performs control such that a second-type antenna in which the strength of the jamming signal is weakest is finally connected for receiving.

2. The GPS signal reception apparatus as set forth in claim 1, wherein the jamming signal detection unit detects the jamming signal present in the GPS signal by calculating a noise level of a spectrum generated by Fast Fourier Transform (FFT) on the GPS signal, and then comparing a peak value of the spectrum with the noise level.

3. The GPS signal reception apparatus as set forth in claim 2, wherein the jamming signal detection unit determines the GPS signal as the jamming signal if a peak value of the spectrum is greater than the noise level.

4. The GPS signal reception apparatus as set forth in claim 1, wherein the jamming signal detection unit determines a type of the jamming signal present in the GPS signal which is received from each of the plurality of second-type antennas.

5. The GPS signal reception apparatus as set forth in claim 1, further comprising a jamming signal alert unit for transmitting information about a type and strength of the jamming signal, which was detected by the jamming signal detection unit, to surrounding GPS signal reception apparatuses.

6. The GPS signal reception apparatus as set forth in claim 1, further comprising a GPS signal division unit for dividing the OPS signal, received via the antenna selected by the GPS signal selection unit, into two equal signals, and then outputting any one of the two signals, obtained through the division, to the jamming signal detection unit.

7. The GPS signal reception apparatus as set forth in claim 6, further comprising a time synchronization GPS reception unit for providing another signal of the two signals, obtained through the division performed by the GPS signal division unit, as a signal used for performing time synchronization.

8. The GAS signal reception apparatus as set forth in claim 1, wherein:
the first-type antenna is an exposed antenna in which a reception area is not restricted; and
the plurality of second-type antennas are sector antennas in which reception areas are spatially restricted.

9. The GPS signal reception apparatus as set forth in claim 1, wherein each of the plurality of second-type antennas is arranged at a predetermined angle in a horizontal plane, and is provided with a metal plate therebetween.

10. A GPS signal reception method, comprising:
selecting any one of a first-type antenna and a plurality of second-type antennas as a selected antenna, the plurality of second-type antennas having directivities different from each other;
detecting a jamming signal present in a GPS signal by analyzing the GPS signal which is received from the selected antenna;
when a jamming signal is detected in the GPS signal, measuring a strength of the jamming signal present in the GPS signal which was received from the selected antenna among the second-type antennas while sequentially changing the selected antenna among the plurality of second-type antennas; and
finally selecting a second-type antenna in which the strength of the jamming signal is weakest from among the plurality of second-type antennas as the selected antenna.

11. The GPS signal reception method as set forth in claim 10, wherein the detecting the jamming signal comprises:
performing FFT on the GPS signal;
calculating a noise level of a spectrum obtained by the FFT; and
comparing a peak value of the spectrum with the noise level.

12. The GPS signal reception method as set forth in claim 11, wherein the detecting the jamming signal comprises determining the GPS signal as the jamming signal lithe peak value of the spectrum is greater than the noise level.

13. The GPS signal reception method as set forth in claim 10, wherein the detecting the jamming signal comprises determining a type of the jamming signal present in the GPS signal which is received from each of the plurality of second-type antennas.

14. The GPS signal reception method as set forth in claim 10, further comprising transmitting information about a type and strength of the jamming signal to surrounding GPS signal reception apparatuses.

15. The GPS signal reception method as set forth in claim 10, further comprising dividing the GPS signal, received via the selected antenna, into two signals, and
wherein the detecting the jamming signal comprises detecting the jamming signal by analyzing any one of the two signals obtained through division.

16. The GPS signal reception method as set forth in claim 15, further comprising
providing another signal of the two signals, obtained by the division, as a signal used for performing time synchronization.

17. The GPS signal reception method as set forth in claim 10, wherein:
the first-type antenna is an exposed antenna in which a reception area is not restricted; and
the plurality of second-type antennas are sector antennas in which reception areas are spatially restricted.

* * * * *